July 14, 1936.  L. E. BLANCHARD  2,047,353
INDICATING INSTRUMENT
Filed July 17, 1929  2 Sheets-Sheet 1
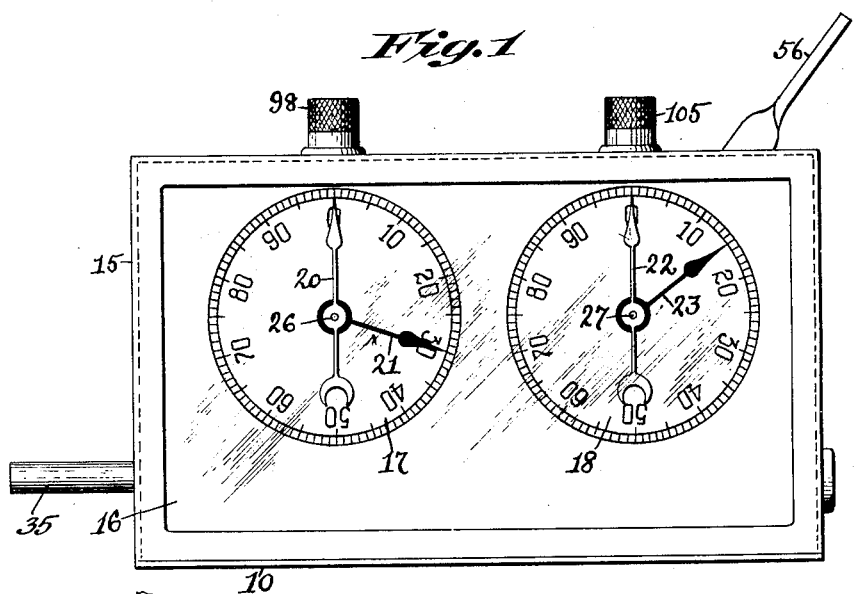
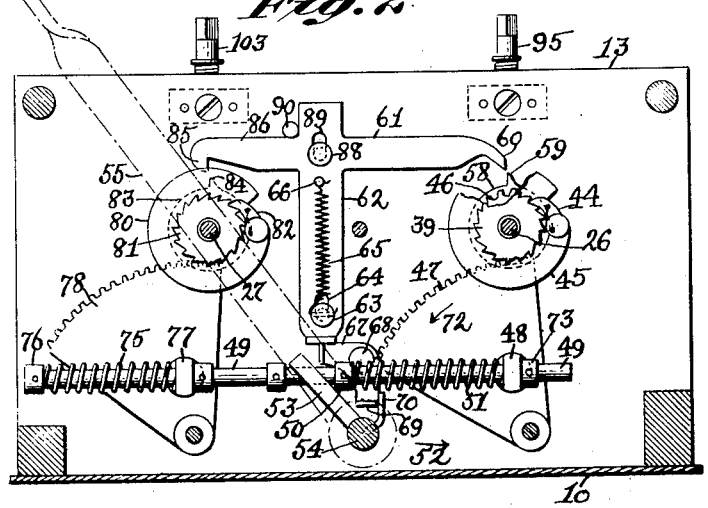
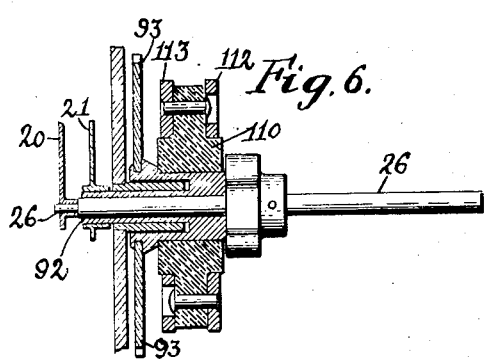
Inventor
Leon E. Blanchard
by Jas. H. Churchill
Atty.

July 14, 1936.  L. E. BLANCHARD  2,047,353
INDICATING INSTRUMENT
Filed July 17, 1929  2 Sheets-Sheet 2
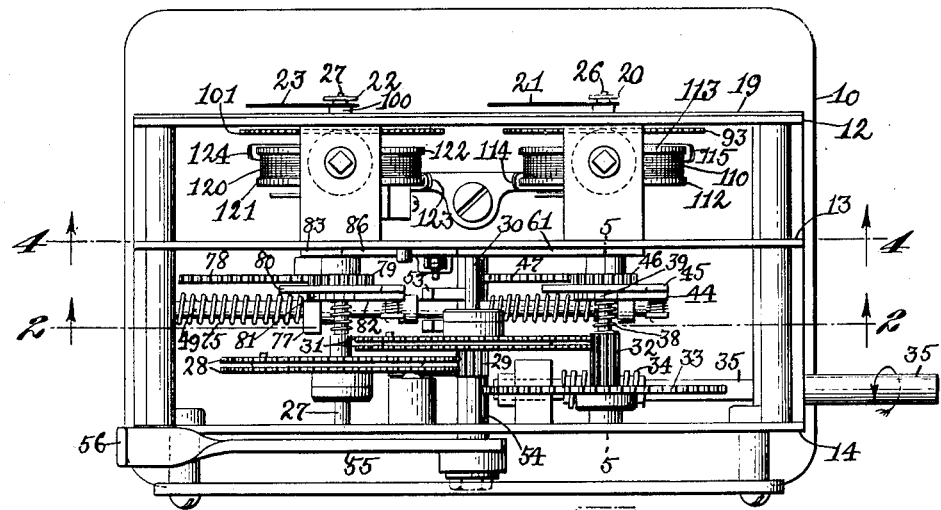
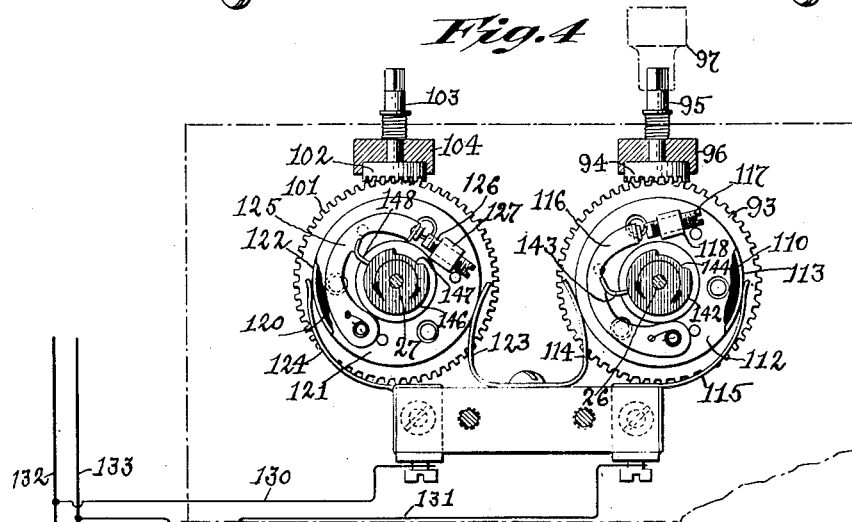
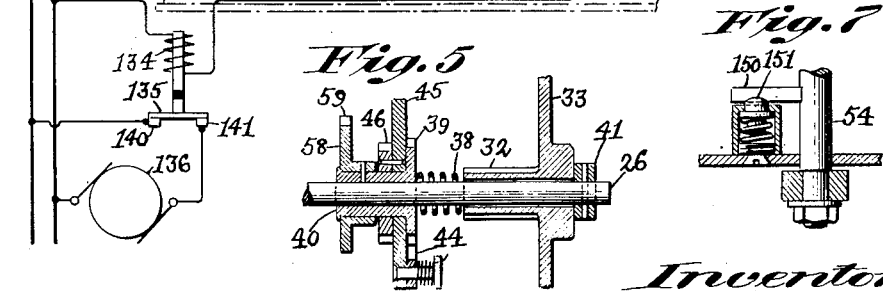
Inventor
Leon E. Blanchard
by Jas. H. Churchill
Atty.

Patented July 14, 1936

2,047,353

UNITED STATES PATENT OFFICE 2,047,353

INDICATING INSTRUMENT

Leon E. Blanchard, Somerville, Mass., assignor to Barbour Stockwell Company, Cambridge, Mass., a corporation Application July 17, 1929, Serial No. 379,028

3 Claims. (Cl. 235—144)

This invention relates to instruments of that character in which a plurality of pointers cooperate with a dial provided with graduations indicative of work done, and one of which pointers is manually-operated and the other of which is operated by power.

The invention has for one of its objects to provide for resetting the power-operated pointer to normal or zero position substantially in an instant and by means of a device which is accessible from outside the instrument.

The invention further has for its object to provide an instrument having a plurality of dials and pointers with the power-operated pointers geared together so that one of the power-operated pointers is moved the distance of one graduation on its dial for each complete revolution of the power-operated pointer co-operating with the other dial, and both of which pointers are reset to zero position simultaneously and substantially in an instant.

The invention further has for its object to provide an electric circuit controller which is movable with the manually-operated pointer and has a movable member which is governed by a cam or device movable with the power-operated pointer and arranged to permit the movable member to operate and close or open the electric circuit as desired, when the power-operated pointer registers with the manually-operated pointer.

When two dials and their co-operating pointers are employed as herein shown, the circuit controllers are arranged to close the electric circuit at two points, which occurs when both power-operated pointers register with both manually-operated pointers as will be described.

These and other features of this invention will be pointed out in the claims at the end of this specification.

Fig. 1 is a front elevation of an indicating instrument embodying this invention, Fig. 2, a vertical section taken on the line 2—2, Fig. 3, to illustrate the resetting mechanism looking from the rear of the instrument as indicated by the arrow on Fig. 3;

Fig. 3, a plan view with the cover of the casing removed;

Fig. 4, a diagrammatic view to illustrate the operation of the electric circuit controllers and showing the instrument in section taken on the line 4—4, Fig. 3, looking from the rear of the instrument;

Fig. 5, a detail in section on the line 5—5, Fig. 3, showing the pawl and ratchet mechanism for coupling the shaft of the power-operated pointer and the reset mechanism;

Fig. 6, a detail in section showing the pointer shafts, the carrier for the circuit controller and the cam co-operating with the latter, and Fig. 7, a detail of a friction device to be referred to.

In the present instance, the invention is embodied in an instrument whose operative parts are supported by a frame comprising a base plate 10 and upright walls 12, 13, 14, and which parts are protected by a box-like cover 15 having a glass front 16, through which are visible a plurality of dials 17, 18, each provided with graduations arranged in a circle and running from 0 to 100.

The dials 17, 18 are made on a plate 19 secured to the upright wall 12 by screws or otherwise.

The dial 17 has cooperating with it two pointers 20, 21, and the dial 18 has co-operating with it two pointers 22, 23.

The pointers 20, 22 are designed to be rotated by power and the pointers 21, 23 are designed to be rotated manually.

The power-operated pointers 20, 22 may be provided with a white color and the manually-operated pointers with a red or dark color to enable the pointers to be readily distinguished.

The pointers 20, 22 are fast on shafts 26, 27 which are geared together by the gears 28 on the shaft 27 meshing with a pinion 29 on a shaft 30 having gears 31 which mesh with a long pinion 32 (see Fig. 3). Two relatively thin gears 28 and two gears 31 are employed instead of one wide gear 28 and one wide gear 31.

The pinion 32 is attached to a worm gear 33 meshing with a worm 34 on a shaft 35, which constitutes the main shaft of the instrument and is operatively connected with the machine not shown, whose work is to be indicated by the instrument herein shown.

The worm gear 33 is frictionally secured to the shaft 26 to which the pointer 20 is fastened, so that the pointer shaft 26 may be rotated in a continuous manner clock-wise by rotation of the worm shaft 35, and so that the pointer shaft 26 may be rotated independently of the worm-shaft 35, when it is desired to reset the pointer 20 to zero when the worm-shaft is stationary, which occurs when the machine with which the worm-shaft 35 is connected to be driven thereby is stopped.

In the present instance the worm gear 33 is frictionally connected with the pointer shaft 26 by a coiled spring 38 (see Figs. 3 and 5), which is interposed between the long pinion 32 and a ratchet wheel 39 having a hub 40 fast on the pointer shaft 26. The coiled spring 38 abutting against the ratchet wheel 39 forces the worm-gear 33 against a collar 41 pinned to the shaft 26, and creates sufficient friction to enable the pointer shaft 26 to be rotated by the worm-shaft 35 through the worm 34 and worm gear 33.

It will thus be seen that when the worm-shaft 35 is rotated by the machine, not shown, but with which the worm-shaft is connected, the pointer 20 is moved continuously around the dial until the machine is stopped.

When the machine is stopped, the worm-shaft 35 is at rest and the pointer shaft 26 is then capable of being rotated to reset the pointer 20 to zero.

In the instrument herein shown, the pointer 20 may be reset by means of a pawl 44 co-operating with the ratchet 39 in a manner well understood, said pawl being carried by a disk 45 loosely mounted on the hub 40 of the ratchet wheel 39 and having fast to it a gear 46 which meshes with and is rotated by a segmental gear 47 supported by the framework and having rotatably mounted in it a stud 48 through which is extended a rod 49 having fast on it a collar 50 between which and the stud 48 is located a spring 51, which encircles the rod 49 and is compressed when the rod 49 is moved in the direction of the arrow 52 in Fig. 2.

The rod 49 is moved longitudinally in the direction of the arrow 52 to reset the pointer 20 as herein shown, by a forked crank or arm 53 on a rock-shaft 54, which is extended through the rear upright wall 14 and has mounted on it outside of the rear wall, a lever or arm 55 which projects above the top of the casing and is provided at its upper end with a finger piece 56.

When the lever is in the position shown in Figs. 1 and 2, the spring 51 is uncompressed and when it is desired to reset the pointer 20, the lever is moved to the opposite side of the center of the machine from the position shown in Fig. 1 and thereby effects the rotation of the pointer 20 clockwise to the zero position through the segmental gear 47, gear 46, disk 45, pawl 44 and ratchet wheel 39 as above described.

Provision is made for holding the pointer 20 in its zero position after it has been reset until the lever or arm 55 is returned to its normal position.

To this end the hub of the ratchet wheel 39 has fast on it a stop member in the form of a disk 58 provided with a tooth or projection 59 with which co-operates a holding dog or pawl 60 (see Fig. 2) on an arm 61 of a vertically movable bar 62, mounted on the upright wall 13 to slide vertically thereon by means of a screw or pin 63 extended through an elongated slot 64 in the sliding bar 62.

The screw or pin 63 has attached to it one end of a spring 65, the other end of which is attached to a pin 66 on the bar 62.

The spring 65 is arranged to normally draw the sliding bar 62 downward until the upper wall of the slot 64 engages the pin 63, and said spring is elongated by lifting the bar 62, which is effected as herein shown by an arm 67 of an elbow lever pivoted at 68 to the vertical wall 13 and having a depending arm 69 engaged by a pin 70 attached to the rock-shaft 54.

When the lever 55 is moved to its resetting position, namely, from the full line position shown in Fig. 1 and the dotted line position shown in Fig. 2, to the opposite side of the instrument, the pin 70 is moved away from the arm 69, and the spring 65 then moves the bar 62 downward into a position wherein the pawl 60 is brought into the path of the tooth 59 and thereby prevents rotation of the disk 58, the ratchet wheel 39 and the pointer shaft 26, until the operating lever 55 has been returned to its normal position, shown in Figs. 1 and 2.

On the forward stroke or movement of the lever, the spring 51 is compressed more or less depending upon the position of the pointer shaft 26 with relation to the stop pawl 60. If the pointer shaft is located so that the pointer 20 registers with the graduation 90, the pointer shaft 26 will have to move only a short distance before the stop member 59 is engaged with the stop pawl or dog 60, and the pointer shaft 26 is then locked or held against further rotation, but the lever 55 is permitted to be moved forward to the end of its stroke by the fact that the rod 49 is free to be slid through the stud 48 on the segmental gear 47, and the spring 51 is compressed to its fullest extent.

On the return movement of the lever 55, the pressure of the forked arm 53 against the collar 50 is removed, and the spring 51 expands and moves the rod 49 in the direction opposite to that indicated by the arrow 52.

On the return movement of the lever 55, the spring 51 effects movement of the segmental gear 47 in the direction of the arrow 72, and this return movement is completed by the collar 73 fast on the rod 49 engaging the stud 48. As the segmental gear 47 is moved in the direction of the arrow 72, the spur gear 46 is turned freely on the hub of the ratchet wheel 39, as the pawl 44 at such time clicks over the ratchet wheel 39, and the pointer shaft 26 is held by the pawl 60 with the pointer 20 registering with zero on the dial 17.

On the return movement of the lever 55, the pin 70 on the rockshaft 54 is engaged with the arm 69 of the elbow at or near the end of such return movement, and turns the elbow lever so that its arm 67 lifts the sliding bar 60 and raises the holding pawl 60 out of the path of the tooth or projection 59, and thereby releases the pointer shaft 26 and leaves it free to be rotated clockwise by the main shaft 35 as above described.

The rod 49 is operatively connected with the pointer 22 co-operating with the dial 18 by mechanism similar to that above described with relation to the pointer 20, namely, by means of the spring 75 co-operating with a collar 76 fast on the rod and with a rotatable stud 77 carried by the segmental gear 78, which meshes with a gear 79 fast to the disk 80 loosely mounted upon the hub of the ratchet wheel 81 with which co-operates the pawl 82 carried by the disk 80.

The hub of the ratchet wheel 81 has fast on it the disk 83 provided with the stop projection 84 with which co-operates the pawl 85 carried by an arm 86 attached to the sliding bar 62.

By reference to Fig. 2, it will be seen that when the resetting lever 55 is moved from its normal position, shown in Figs. 1 and 2, the spring 75 is compressed and the segmental gear 78 is rotated to effect rotation of the gear 79 and the pointer 22 clockwise, so that the power-operated pointer 22 co-operating with the dial 18 is simultaneously reset to zero with the power-operated pointer 20 co-operating with the dial 17.

The sliding bar 62 is guided at its upper end by a pin 88 extended through a slot 89 and by a pin 90 on the upright wall 13.

Provision is made for manually rotating the pointers 21, 23 and to this end the pointer 21 is mounted on a hollow shaft 92 (see Fig. 6) provided with a gear 93 with which meshes a gear 94 on a shaft 95 supported in a bearing 96 and extended through the upper wall of the cover 15 and adapted to be rotated by a removable key 97. The end of the shaft 92 is normally covered by a removable cap 98.

The pointer 23 is mounted on a like hollow shaft 100 (see Fig. 3), which shaft has the gear 101 with which meshes the pinion 102 on the shaft 103 mounted in the bearing 104 and which is extended up through the cover of the instrument and is normally covered by the cap 105, shown in Fig. 1.

It will thus be observed that both pointers 21, 23 are manually and independently turned into any desired position by the operator.

Provision is made for controlling the machine with which the indicating apparatus is coupled so as to stop the machine when the latter has performed a certain amount of work, as for instance if the machine is a machine for feeding wire, it may be desirable that the machine should be stopped after it has fed forward a given length of wire, as for instance, 1530 feet.

In such instance, the manually operated pointers are turned by the operator so that the pointer 23 registers with the graduation 15 of the dial 18 and the pointer 21 registers with the graduation 30 of the dial 17.

Provision is made for interrupting the circuit of the electric motor employed to drive the machine when 1530 feet of wire have been fed by the machine, and when this amount of wire has been fed by the machine the power-operated pointers 20, 22 will at such time register with the manually-operated pointers 21, 23.

Provision is made for interrupting the circuit of the motor when the power-operated pointers 20, 22 coincide or register with the manually-operated pointers.

To this end the hollow shaft of the gear 93 has mounted on it to revolve therewith a carrier for a circuit controller.

This carrier is represented in Fig. 6 as a disk 110 of insulating material to which are attached on opposite sides thereof metal rings 112—113 electrically disconnected from each other and with which co-operate brushes 114—115. (See Fig. 4.)

The metal rings 112—113 have electrically connected with them the members of a circuit controller. These members are represented as a lever 116 and a screw 117 carried by a stud or post 118.

The lever 116 may be designated the movable member of the circuit controller, and the screw and post the stationary member.

The gear 101 has fast to its hollow shaft a carrier for a circuit controller of like construction, the carrier comprising a disk 120 of insulating material provided with metal rings 121—122 with which co-operate brushes 123—124 and also the movable member 125 and the stationary member 126—127 of a circuit controller.

The contact brushes 114, 115, 123, 124 are included in an electric circuit 130—131 connected with a main circuit 132, 133 and including a relay 134 whose armature 135 controls the circuit of the electric motor 136 employed to drive the machine.

The arrangement is such that when the circuit of the relay 134 is completed the armature 135 is moved away from its co-operating contacts 140, 141 included in circuit with the motor 146 and the latter circuit is broken and the machine is stopped.

The circuit of the relay 134 is controlled at two points, to wit: by the circuit controller 116—117 and by the circuit controller 125—126.

The circuit controller 116 is governed by a cam or device 142 fast on the pointer shaft 26, said cam co-operating with a finger 143 to open the circuit controller 116—117 as represented in Fig. 4 when the finger 143 engages the full periphery of the cam and to permit the member 116 to be engaged with the member 117 when the finger 143 enters a recess 144 in the cam.

The shaft 27 of the pointer 22 is provided with a like cam 146 having a recess 147 and with which co-operates a finger 148 on the lever 125.

The cams 142—146 are fast on the shafts 26, 27 and are power-operated; that is, they are rotated when the pointers 20, 22 are operated by the machine whose work is to be indicated.

The circuit controllers 116—117, 125, 126 are fast to the carriers or disks 110, 120 and are manually adjusted or positioned with relation to the recesses 144—147 of the cams when the manually-operated pointers 21, 23 are positioned at the graduation indicative of the number of feet of wire, which is to be fed from the machine before the latter is stopped, which number of feet as above noted is 1530 in the present instance.

It will thus be seen that the circuit of the relay 134 is opened at two points and may be closed at one point, to wit: by the circuit controller 116—117 on each revolution of the power-operated pointer 20 without affecting the relay, as the circuit of the latter remains open at the circuit controller 125—126 until the power-operated pointer 22 has been brought into register with the pointer 23.

When this occurs the circuit of the relay 134 is closed at the controller 125—126, but is opened at the controller 116, 117 until the pointer 20 has then been moved into register with the pointer 21, whereupon the circuit of the relay is closed at both circuit controllers.

When the machine has fed 1500 feet the power-operated pointer 22 of the second dial will at such time have been moved to the graduation 15 and will register with the pointer 23 and at such time the machine will have fed 1500 feet of wire.

When the machine has fed the additional 30 feet of wire, the power-operated pointer 20 will have been moved to the graduation 30 and will register with the pointer 21.

When the power-operated pointer 22 registers with the pointer 23 of the dial 18, the finger 148 on the circuit controller 125 will drop into the recess 147 in the cam 146 and the circuit of the relay will be closed at one point by the member 125 engaging the member 126.

The circuit of the relay will not, however, be completed until 30 more feet of wire have been fed forward, and at such time the power-operated pointer 20 will have been moved to the graduation 30 and will register with the pointer 21.

At such time the finger 143 will drop into the recess 144 of the cam 142 and the movable member 116 will engage the stationary member 117 of the circuit controller, thereby closing the circuit of the relay 134 at the second point, whereupon the relay is energized and the main circuit of the motor 136 is opened and the machine stopped.

The operation of the machine to feed a second length of 1530 feet may be repeated by again closing the circuit of the motor 136, which is effected by moving the resetting lever 55 so as to reset the power-operated pointers 20, 22 to zero, which pointers are moved clockwise or in the same direction they are moved by power, and when the pointers 20, 22 are reset to zero, the cams 142—146 are moved with them clockwise and the high part of the cam co-operating with the fingers 143, 148 opens the circuit of the relay which permits the main circuit to be closed by deenergizing the relay.

On the return movement of the resetting lever 55, which is effected by the springs 51, 75, the pawl-carrying disks 45, 80 are rotated counter-clockwise, the pawls 44, 82 clicking over the ratchet disks 39, 81.

When it is desired to stop the machine after the latter has fed any other desired length of wire, the pointers 21, 23 are manually positioned to register with the graduations on the dials indicative of the new length of wire to be fed by the machine.

When the cover is placed upon the machine, it is secured to the rear upright wall 14 by screws or otherwise, and the only parts of the machine which are accessible to the operator are the thumb caps 98, 105 and the resetting lever 55, thereby rendering the instrument practically inaccessible to the operator and to that extent fool-proof.

In the present instance the rock-shaft 54 to which the reset lever 55 is attached is provided with a crank or arm 150 with which co-operates a spring-pressed plunger 151 to frictionally hold the rock-shaft 54 in its starting position.

In the present instance the resetting lever 55 operates the resetting mechanism for two power-operated pointers co-operating with two dials.

It is not desired to limit the invention in this respect, as the resetting feature may be embodied in an instrument having but a single power-operated pointer co-operating with a single dial.

One construction of mechanism actuated by the resetting lever is herein shown, but it is not desired to limit the invention to the particular construction shown.

What is claimed is:

1. In an instrument of the character described, in combination, a dial provided with graduations, a pointer cooperating with said dial, a shaft on which said pointer is mounted, a ratchet wheel fast on said pointer shaft, a rock shaft, a lever for operating said rock shaft, gearing actuated by movement of said lever in one direction and cooperating with said ratchet wheel to rotate the pointer shaft, a stop on said pointer shaft, a stop pawl cooperating with said stop to arrest rotation of said pointer shaft effected by said lever, a spring to return said lever to its starting position, and means to disengage said stop pawl from said stop when said lever is returned to its starting position.

2. In an instrument of the character described, in combination, a dial provided with graduations, a pointer cooperating with said dial, a shaft on which said pointer is mounted, a stop on said pointer shaft, a pawl normally co-operating with said stop to permit rotation of said pointer shaft, a manually operated rock shaft connected with said stop pawl to release said pointer shaft, means connecting said rock shaft with said pointer shaft to rotate the latter, and means controlled by said rock shaft for moving the stop pawl into the path of the stop on the pointer shaft to arrest rotation of the latter.

3. In an instrument of the character described, in combination, a dial provided with graduations, a pointer co-operating with said dial, a shaft on which said pointer is mounted, a stop on said pointer shaft, a pawl movable into and out of the path of said stop, a manually operated rock-shaft co-operating with said pawl to move it out of the path of said stop and release said pointer shaft, gearing actuated by said rock-shaft for rotating the pointer shaft when said rock-shaft is moved in one direction, means for moving the pawl into the path of said stop when said gearing is actuated by said rock-shaft, and means actuated by said rock-shaft when moved in the opposite direction for effecting movement of the pawl out of the path of said stop.

LEON E. BLANCHARD.